United States Patent [19]

Hartsing, Jr. et al.

[11] Patent Number: 4,588,623

[45] Date of Patent: May 13, 1986

[54] METAL PLATED POLY(ARYL ETHER) CONTAINING ARTICLES

[75] Inventors: Tyler F. Hartsing, Jr., Westfield; Marvin E. Sauers, Belle Mead; Lloyd M. Robeson, Whitehouse Station, all of N.J.

[73] Assignee: Union Carbide Corporation, Danbury, Conn.

[21] Appl. No.: 734,692

[22] Filed: May 16, 1985

Related U.S. Application Data

[63] Continuation of Ser. No. 655,434, Sep. 28, 1984, abandoned.

[51] Int. Cl.$^4$ .............................................. F16L 9/12
[52] U.S. Cl. ...................................... 428/36; 428/416; 428/418; 428/419; 428/461; 428/462; 525/65; 525/67; 525/68; 525/132; 525/146; 525/150

[58] Field of Search ................ 428/36, 416, 418, 419, 428/461, 462

[56] References Cited

U.S. PATENT DOCUMENTS

| | | | |
|---|---|---|---|
| 3,238,087 | 3/1966 | Norwalk et al. | 428/417 |
| 4,175,175 | 11/1979 | Johnson et al. | 528/125 |
| 4,457,977 | 7/1984 | Waller | 428/461 |
| 4,532,288 | 7/1985 | Robeson | 525/68 |

FOREIGN PATENT DOCUMENTS

29059  2/1983  Japan .................................. 525/150

*Primary Examiner*—Jacob Ziegler
*Attorney, Agent, or Firm*—D. M. Papuga

[57] ABSTRACT

A metal plated poly(aryl ether) containing article, said poly(aryl ether) comprising a blend of a poly(aryl ether) polymer, a styrene and/or acrylic copolymer and a compatibilizing amount of a polyhydroxyether.

19 Claims, No Drawings

METAL PLATED POLY(ARYL ETHER) CONTAINING ARTICLES

This application is a continuation of prior U.S. application Ser. No. 655,434, filing date Sept. 28, 1984, now abandoned.

BACKGROUND OF THE INVENTION

This invention is directed to metal plated poly(aryl ether) containing articles, said poly(aryl ether) comprising a blend of a poly(aryl ether) polymer, a styrene polymer and/or acrylic copolymers and a compatibilizing amount of a polyhydroxyether.

Poly(aryl ether) polymers, particularly polysulfone, are tough, rigid, high strength thermoplastic materials which maintain their properties over a wide temperature range of from $-150°$ F. to above $300°$ F. They have a continuous use temperature of about $300°$ F. They are hydrolytically stable and have excellent mechanical, electrical and chemical properties which allows them to be molded into a variety of articles. Articles made from these poly(aryl ether) polymers have been plated with metals. However, the polymer most widely used for metal plating is an acrylonitrile-styrene-butadiene (ABS) resin. The disadvantage of ABS is that it has a low heat distortion temperature. Thus, ABS cannot be used for applications such as high temperature plumbingware. It has now been found that an article made from a blend of a poly(aryl ether), a styrene and/or acrylic copolymer and a compatibilizing amount of a polyhydroxyether can be used in applications such as high temperature plumbingware. This blend can also be plated on plating lines (procedures) commonly used for ABS (the standard of the plated plastics industry).

THE INVENTION

This invention is directed to a metal plated poly(aryl ether) containing articles, the poly(aryl ether) comprising a blend of a poly(aryl ether) polymer, a styrene and/or acrylic copolymer, and a compatibilizing amount of a polyhydroxyether.

The poly(aryl ether) polymer may be described as a linear, thermoplastic polyarylene polyether wherein the arylene units are interspersed with other ether, sulfone or ketone linkages. These resins may be obtained by reaction of an alkali metal double salt of a dihydric phenol and a dihalobenzenoid or dinitrobenzenoid compound, either or both of which contain a sulfone or a ketone linkage, i.e., —SO$_2$— or —CO—, between arylene groupings, to provide sulfone or ketone units in the polymer chain in addition to arylene units and ether units. The polymer has a basic structure comprising recurring units of the formula: O—E—O—E′ wherein E is the residuum, of the dihydric phenol and E′ is the residuum of the benzenoid compound having an inert electron withdrawing group in at least one of the positions ortho and para to the valence bonds; both of said residua are valently bonded to the ether oxygens through aromatic carbon atoms. Such aromatic polyethers are included within the class of polyarylene polyester resins described in, for example, U.S. Pat. Nos. 3,264,536 and 4,175,175. It is preferred that the dihydric phenol be a weakly acidic dinuclear phenol such as, for example, the dihydroxyl diphenyl alkanes or the nuclear halogenated derivatives thereof, such as, for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols" are also highly valuable and preferred. These materials are the bisphenols of a symmetrical or unsymmetrical joining group, as, for example, ether oxygen (—O—), carbonyl

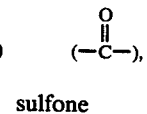

sulfone

or hydrocarbon residue in which the two phenolic nuclei are joined to the same or different carbon atoms of the residue.

Such dinuclear phenols can be characterized as having the structure:

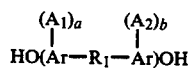

wherein Ar is an aromatic group and preferably is a phenylene group, A$_1$ and A$_2$ can be the same or different inert substituent groups such as alkyl groups having from 1 to 4 carbons atoms, halogen atoms, i.e., fluorine, chlorine, bromine or iodine, or alkoxy radicals having from 1 to 4 carbon atoms, a and b are integers having a value from 0 to 4, inclusive, and R$_1$ is representative of a bond between aromatic carbon atoms as in dihydroxyldiphenyl, or is a divalent radical, including for example, radicals such as

—O—, —S—, —SO—, —S—S—, —SO$_2$, and divalent hydrocarbon radicals such as alkylene, alkylidene, cycloalkylene, cycloalkylidene, or the halogen, alkyl, aryl or like substituted alkylene, alkylidene and cycloaliphatic radicals as well as aromatic radicals and rings fused to both Ar groups.

Examples of specific dihydric polynuclear phenols include among others: the bis-(hydroxyphenyl) alkanes such as 2,2-bis-(4-hydroxyphenyl)-propane, 2,4′-dihydroxydiphenylmethane, bis-(2-hydroxyphenyl)methane, bis-(4-hydroxyphenyl)methane, bis(4-hydroxy-2,6-dimethyl-3-methoxyphenyl)methane, 1,1-bis-(4-hydroxyphenyl)ethane, 1,2-bis-(4-hydroxyphenyl)ethane, 1,1-bis-(4-hydroxy-2-chlorophenyl)-ethane, 1,1-bis-(3-methyl-4-hydroxyphenyl)propane, 1,3-bis-(3-methyl-4-hydroxyphenyl)propane, 2,2-bis-(3-phenyl-4-hydroxyphenyl)propane, 2,2-bis-(3-isopropyl-4-hydroxyphenyl)propane, 2,2-bis-(2-isopropyl-4-hydroxyphenyl)propane, 2,2-bis-(4-hydroxy-naphthyl)-propane, 2,2-bis-(4-hydroxyphenyl)pentane, 3,3-bis-(4-hydroxyphenyl)-pentane, 2,2-bis-(4-hydroxyphenyl)heptane, bis-(4-hydroxyphenyl)phenylmethane, 2,2-bis-(4-hydroxyphenyl)-1-phenyl-propane, 2,2-bis-(4-hydroxyphenyl)-1,1,1,3,3,3,-hexafluoro-propane, and the like;

di(hydroxyphenyl)sulfones such as bis-(4-hydroxyphenylsulfone), 2,4'-dihydroxydiphenyl sulfone, 5-chloro-2,4'-dihydroxydiphenyl sulfone, 5'-chloro-4,4'-dihydroxydiphenyl sulfone, and the like;

di(hydroxyphenyl)ethers such as bis-(4-hydroxyphenyl)ether, the 4,3'-, 4,2'-2,2'-2,3-, dihydroxyphenyl ethers, 4,4'-dihydroxy-2,6-dimethyldiphenyl ether, bis-(4-hydroxy-3-isobutyl phenyl)ether, bis-(4-hydroxy-3-isopropylphenyl) ether, bis-(4-hydroxy-3-chlorophenyl)ether, bis-(4-hydroxy-3-fluorophenyl)ether, bis-(4-hydroxy-3-bromophenyl)ether, bis-(4-hydroxy naphthyl)ether, bis-(4-hydroxy-3-chloronaphthyl) ether, and 4,4'-dihydroxy-3,6-dimethoxydiphenyl ether.

As herein used the E term defined as being the "residuum of the dihydric phenol" of course refers to the residue of the dihydric phenol after the removal of the two aromatic hydroxyl groups. Thus as is readily seen these polyarylene polyethers contain recurring groups of the residuum of the dihydric phenol and the residuum of the benzenoid compound bonded through an aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5 percent for best results.

An electron withdrawing group can be employed as the activator group in these compounds. It should be, of course, inert under the reaction conditions, but otherwise its structure is not critical. Preferred are the strong activating groups such as the sulfone group

bonding two halogen or nitro substituted benzenoid nuclei as in the 4,4'-dichlorodiphenyl sulfone and 4,4'-difluoro diphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated. Preferably, all of the substituents on the benzeonid nucleus are either hydrogen (zero electron withdrawing), or other groups having a positive sigma value, as set forth in J. F. Bunnett in Chem. Rev. 49 273 (1951) and Quart. Rev., 12, 1 (1958). See also Taft, *Steric Effects in Organic Chemistry*, John Wiley & Sons (1956), chapter 13; *Chem,* Rev., 53, 222; JACS, 74,3120; and JACS, 75, 4231.

The activating group can be basically either of two types:

(a) monovalent groups that activate one or more halogens or nitro-groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens on two different rings, such as the sulfone group

the carbonyl group

the vinylene group

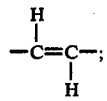

the sulfoxide group

the azo group —N=N—; the saturated fluorocarbon groups —CF$_2$CF$_2$—; organic phosphine oxides

where R$_2$ is a hydrocarbon group, and the ethylidene group

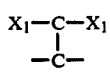

where X$_1$ can be hydrogen or halogen and activating groups within the nucleus which can activate halogens or nitro functions on the same ring such as in the case with difluorobenzoquinone, 1,4- or 1,5- or 1,8-difluoro anthraquinone, etc.

If desired, the polymers may be made with mixtures of two or more dihalobenzenoid or dinitro benzenoid compounds. Thus, the E' residuum of the benzenoid compounds in the polymer structure may be the same or different.

It is seen also that as used herein, the E' term defined as being the "residuum of the benzenoid compound" refers to the aromatic or benzenoid residue of the compound after the removal of the halogen atom or nitro group on the benzenoid nucleus.

The polyarylene polyethers of this invention are prepared by methods well known in the art as for instance the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt of the reaction with the alkali metal, the alkali metal hydride, alkali metal hydroxide, alkali metal alkoxide or the alkali metal alkyl compounds. Preferably, the alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

The polymerization reaction proceeds in the liquid phase of a sulfoxide or sulfone organic solvent at elevated temperatures.

A preferred form of the polyarylene polyethers of this invention are those prepared using the dihydric polynuclear phenols of the following four types, including the derivatives thereof which are substituted with inert substituent groups

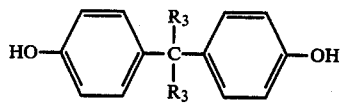
(a)

in which the $R_3$ group represents independently hydrogen, lower alkyl, aryl and the halogen substituted groups thereof, which can be the same or different;

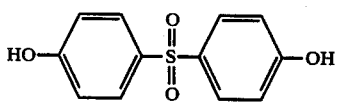
(b)

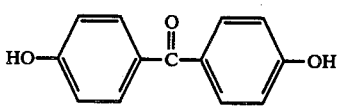
(c)

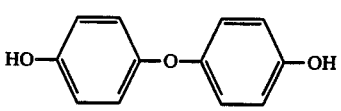
(d)

and substituted derivatives thereof.

It is also contemplated in this invention to use a mixture of two or more different dihydric phenols to accomplish the same ends as above. Thus when referred to above the —E— residuum in the polymer structure can actually be the same or different aromatic residue.

In order to secure the high polymers, the system should be substantially anhydrous, and preferably with less than 0.5 percent by weight water in the reaction mixtures.

The poly(aryl ether)s have a reduced viscosity of from about 0.30 to about 1.5 as measured in an appropriate solvent at an appropriate temperature depending on the particular polyether, such as in methylene chloride at 25° C.

The preferred poly(aryl ether)s have repeating units of the formula:

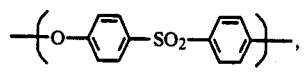,

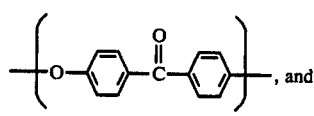, and

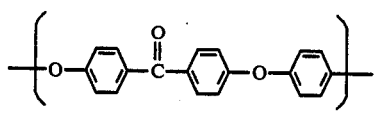

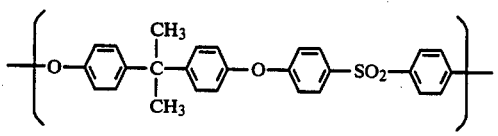

The styrene polymers suitable for use herein are co- or higher polymers and include ABS type polymers, the molecules of which contain two or more polymeric parts of different compositions that are bonded chemically. The polymer is preferably prepared by polmerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the polymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, and the like.

The specific conjugated diene monomers normally utilized in preparing the backbone of the graft polymer are generically described by the following formula:

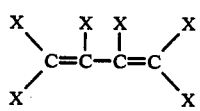

wherein X is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes. A preferred conjugated diene is butadiene.

One monomer of group of monomers that may be polymerized in the presence of the prepolymerized backbone are monovinylaromatic hydrocarbons. The monovinylaromatic monomers utilized are generically described by the following formula:

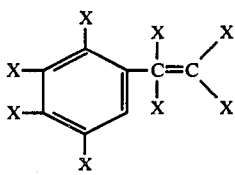

wherein X is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, α-methylstyrene, α-methyl vinyltoluene, α-chlorostyrene, α-bromostyrene, dichlorostyrene, dibromostyrene, p-tertbutylstyrene, tetra-chlorostyrene, mixtures thereof, and the like. The preferred monovinylaromatic hydrocarbons used are styrene and/or x-methylstyrene.

A second group of monomers that may be polymerized in the presence of the prepolymerized backbone are acrylic monomers such as acrylonitrile, substituted acrylonitrile and/or acrylic acid esters, exemplified by alkyl acrylates such as ethyl acrylate and methyl methacrylate, and maleic anhydride.

The acrylonitrile, substituted acrylonitrile, or acrylic acid esters are described by the following formula:

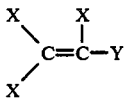

wherein X is as previously defined and Y is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, α-chloroacrylonitrile, chloracrylonitrile, bromoacrylonitrile, and α-bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50 percent by weight of the total graft polymer composition. The monomers polymerized in the presence of the backbone, exemplified by stryene and acrylonitrile, comprise from about 40 to about 95 percent by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, elastomers such as ethylene-propylene-diene rubber and isobutylene-isoprene copolymers may be used.

The acrylate copolymer includes copolymers or higher polymers of methyl methacrylate with a vinyl monomer (e.g. acrylonitrile, N-allymaleimide, vinyl chloride or N-vinyl maleimide), or an alkyl acrylate or methacrylate in which the alkyl group contains from 1 to 8 carbon atoms, such as methyl acrylate, ethyl acrylate, butyl acrylate, ethyl methacrylate and butyl methacrylate. The amount of methyl methacrylate is greater than about 70 percent by weight of this copolymer resin. Methylmethyacrylate may comprise 100 percent of this resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The acrylate resins have a reduced viscosity of from 0.1 to about 2.0 dl/g in a one percent chloroform solution at 25° C.

Also included herein are acrylate-styrene-acrylonitrile polymers which are known in the art and described, for example, in U.S. Pat. No. 3,944,631. The acrylate which may be used to prepare the polymer includes the crosslinked polymers of the $C_2$–$C_{10}$ alkyl acrylate and the $C_8$–$C_{22}$ alkyl methacrylate monomers, preferably the $C_4$–$C_8$ alkyl acrylates, such as poly(n-butyl acrylate), poly(ethyl acrylate) and poly(2-ethyl hexylacrylate). These polymers are prepared by methods well known in the art such as described in said U.S. Pat. No. 3,944,631.

The thermoplastic polyhydroxyethers which may be used herein have the following general formula:

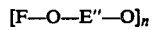

where F is the radical residuum of a dihydric phenol, E″ is a radical residuum of an epoxide selected from mono and diepoxides and which contain from 1 to 2 hydroxyl groups, and n is an integer which represents the degree of polymerization and is at least about 20 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

Any dihydric phenol can be used in forming polyhydroxyethers. Illustrative dihydric phenols are mononuclear dihydric phenols such as hydroquinone, resorcinol, and the like as well as the polynuclear phenols. The dihydric polynuclear phenols have the general formula:

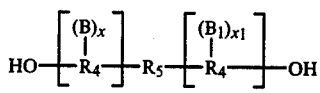

wherein $R_4$ is an aromatic divalent hydrocarbon radical, such as naphthylene and phenylene with phenylene being preferred, B and $B_1$ may be the same or different and are selected from alkyl radicals, such as methyl, n-propyl, n-butyl, n-hexyl, n-octyl and the like, preferably alkyl radicals having 1 to 4 carbon atoms; halogen atoms, i.e., chlorine, bromine, iodine, or fluorine; or alkoxy radicals such as methoxy, methoxymethyl, ethoxy, ethoxyethyl, n-butyloxy, amyloxy and the like, preferably an alkoxy radical having 1 to 4 carbon atoms, x and $x_1$ are independently integers of 0 to 4, $R_5$ is alkylene, alkylidene, cycloalkylene or a saturated divalent group. Particularly preferred are dihydric polynuclear phenols having the general formula:

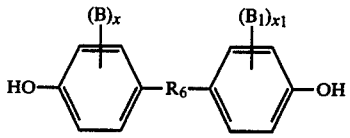

wherein B, $B_1$, x, and $x_1$ are as previously defined, and $R_6$ is an alkylene or alkylidene group, preferably having from 1 to 3 carbon atoms, or cycloalkylene having 6 to 12 carbon atoms.

Diepoxides useful for the preparation of polyhydroxyethers may be represented by repeating units of the following formula:

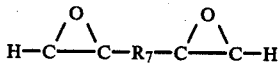

wherein $R_7$ is representative of a bond between adjacent carbon atoms or a divalent organic radical such as an aliphatic, aromatic, cyclic, heterocyclic or acylic arrangement of atoms.

Other diepoxides which can be mentioned include those wherein two oxirane groups are linked through an aromatic ether, i.e., compounds having the grouping

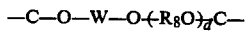

wherein $R_8$ is a divalent organic radical, W is a divalent aromatic radical residuum of a dihydric phenol, such as those listed above in the description of dihydric phenols, and d is an integer from 0 to 1 inclusive.

Still other diepoxides include ethers wherein the oxirane groups are connected to vicinal carbon atoms at least one pair of which is a part of a cycloaliphatic hydrocarbon.

These polyhydroxy ethers are prepared by methods well known in the art, such as those described in, for example, U.S. Pat. Nos. 3,238,087; 3,305,528; 3,294,747; and 3,277,051.

The poly(aryl ether) in the composition of this invention is used in amounts of from about 20 to about 85, preferably from about 30 to about 75 weight percent; the styrene and/or acrylic copolymer in amounts of from about 80 to about 15, preferably from about 70 to about 25 weight percent, and the polyhydroxyether in amounts of from about 0.5 to about 20, preferably from about 1 to about 10 weight percent.

It should, of course, be obvious to those skilled in the art that other additives may be included in the present compositions. These additives include plasticizers, pigments, thermal stabilizers, ultraviolet light stabilizers, flame retardants, processing aids, impact modifiers and the like.

The impact modifiers which are particularly suitable for use herein are described in U.S. Pat. No. 4,231,922. These impact modifiers are a graft copolymer of a vinyl aromatic, an acrylate, an unsaturated nitrile, or mixtures thereof, grafted onto an unsaturated elastomeric backbone and having a tensile modulus (as measured by ASTM D-638, except that the test piece is compression molded to a 20 mil thickness) of less than about 100,000 psi, and preferably from about 15,000 to less than about 100,000 psi.

The unsaturated elastomeric backbone may be polybutadiene, poly(butadiene-co-styrene), poly(butadiene-co-acrylonitrile), or poly(isoprene). In each of the polymers there is sufficient butadiene to give the polymer a rubbery character.

The constituents which are grafted onto the unsaturated elastomeric backbone are selected from a vinyl aromatic, such as styrene, -methylstyrene, alkylstyrene or mixtures thereof; an acrylate such as the acrylic ester monomers, such as methyl acrylate, ethyl acrylate, butyl acrylate, methyl methacrylate, or mixtures thereof; an unsaturated nitrile such as acrylonitrile, methacrylonitrile, or mixtures thereof. It will be understood that the vinyl aromatic, acrylate and acrylonitrile may be used individually or in any combinations in grafting onto the unsaturated elastomeric backbone.

These impact modifiers are free-flowing powders and are commonly available as impact modifiers for poly(vinyl chloride) as described in, for example, V. Shakaypal, in "Developments in PVC Technology", edited by J. H. L. Hensen and A. Whelan, Applied Science Publishers Ltd., New York, 1973.

The grafted constituents of the impact modifier comprise from about 20 to about 60 percent by weight of said constituents such that their tensile modulus does not exceed about 100,000 psi, and is preferably, between about 15,000 to less than about 100,000 psi.

The compositions of this invention are prepared by conventional mixing methods. For example, a preferred method comprises mixing the poly(aryl ether), the styrene and/or acrylic copolymer, and a poly(hydroxyether) and other optional ingredients in powder or granular form in an extruder and extruding the mixture into strands, chopping the strands into pellets and molding the pellets into the desired article.

The compositions of this invention may include mineral fillers, reinforcing agents such as fiberglass, carbon fibers, and the like. The composition may also include thermal stabilizers, ultraviolet light stabilizers, plasticizers, and the like.

THE ARTICLE

The composition of this invention can be molded into a variety of end articles using conventional molding procedures. The composition may be extruded into sheet, pipe and profiles. Specifically, the composition may be molded into plumbingware, appliances, and the like. The preferred articles are plumbingware such as pipes. The articles may be plated with copper, nickel, etc., according to the procedure described below.

EXAMPLES

The following examples serve to give specific illustrations of the practice of this invention but they are not intended in any way to limit the scope of this invention.

General Procedure for the Preparation of the Substrate and Plating

The composition of this invention was molded into test plaques on a reciprocating screw injection molding machine with a 2:1 compression ratio screw with a back pressure of 30-350 psi. The stock temperature was 260°-315° C. and the mold temperature was 120° C. The plaque was then subjected to the following steps: hydrolizer, conditioner, etch, neutralizer, accelerator and copper depositing. Specifically the steps are the following:

I. Hydrolyzer

To make up a 100-gallon hydrolyzer bath, 5 gallons of PM-930, 450 pounds of chromic acid ($CrO_3$), 10 gallons of concentrated sulfuric acid ($H_2SO_4$)66° Baume, and 75 gallons of water are used as follows:

Step 1—Pour 75 gallons of water into a suitable lead-lined tank.

Step 2—Add 5 gallons of PM-930 concentrate.

Step 3—Slowly add 450 pounds of chromic acid. Stir continuously, preferably by means of vigorous air agitation.

Step 4—Add 10 gallons of 66° Baume Sulfuric Acid.

After the bath temperature has been adjusted between 140° and 147° F., the hydrolyzer bath is ready for use. It prepares the plaque for metal to plastic bonding.

II. Conditioner

A 100-gallon PM-920 bath is made up using 17 gallons of PM-920 concentrate and 83 gallons deionized water as follows:

Step 1—Pour 83 gallons of deionized water into a suitable stainless steel tank.

Step 2—Add 17 gallons of PM-920 concentrate. Stir to mix thoroughly.

After the bath temperature has been adjusted between 90° and 100° F., the conditioner bath is ready for use.

III. Etch

A 100-gallon PM-930 bath is made from 25 gallons of PM-930 concentrate, 850 pounds of chromic acid ($CrO_3$) and deionized water as follows:

Step 1—Pour 10 gallons of deionized water into a suitable lead-lined tank.

Step 2—Add 25 gallons of PM-930 concentrate.

Step 3—Slowly add 700 pounds of chromic acid, preferably by means of vigorous air agitation.

Step 4—Heat the solution to about 170° F., and maintain between 160° and 180° F.

Step 5—Dissolve the remaining 150 pounds of chromic acid in about 10 gallons of deionized water, using the chromic acid drums as containers; then add to the bath.

Step 6—Maintain the bath temperature between 16y0 and 180° F. for about 24 hours. Agitate continuously to ensure complete dissolution of the chromic acid.

Step 7—Adjust temperature to about 150° F. Do not add water to cool the bath.

Step 8—Analyze for chromic acid concentration. Make final adjustments to bring chromic acid concentration between 9.5 and 9.8 pounds per gallon, as follows: if chromic acid is high, add water as necessary; if chromic acid is low, allow solution to lose volume from evaporation.

Allow the chromic acid concentration has been adjusted, the bath is ready for use.

IV. Neutralizer

A 100-gallon PM-950 bath is made up using 4 gallons of PM-950 concentrate, approximately ½ gallon 50% sodium hydroxide and 95 gallons deionized water as follows:

Step 1—Pour in 95 gallons of deionized water.

Step 2—Add 4 gallons of PM-950 concentrate.

Step 3—Mix thoroughly.

Step 4—Add 50% sodium hydroxide (NaOH) in increments to raise the pH above 12.5.

Step 5—Mix thoroughly.

After the bath temperature has been adjusted between 100° and 120° F., the neutralizer bath is ready for use.

V. Accelerator

A 100-gallon PM-960 bath is made up using 10 gallons of PM-960 Concentrate and 90 gallons of deionized as follows:

Step 1—Pour 90 gallons of deionized water into a suitable plastic or plastic-lined tank.

Step 2—Add 10 gallons of PM-960 Concentrate and stir to mix thoroughly.

After the bath temperature has been adjusted, within prescribed operating limits, the accelerator bath is ready for use.

VI. Copper Deposit

A 100-gallon PM-990 bath is made up using 8.5 gallons each of PM-990A, PM-990B, and PM-990M and 74.5 gallons of deionized water as follows:

Step 1—Pour 74.5 gallons of deionized water into a suitable tank.

Step 2—Add 8.5 gallons of PM-990A. Stir.

Step 3—Add 8.5 gallons of PM-990M. Stir.

Step 4—Add 8.5 gallons of PM-990B. Stir for 30 minutes.

After the bath temperature has been adjusted between 75° and 85° F., the Electroless Copper bath is ready for use.

The plaques were plated by exposing them to the solutions in Steps I to VI under the conditions specified in the Table. The adhesion of the metal was then tested. The adhesion values are shown for 4 mils of acid copper. The test pieces were baked for 2 hours at 185° F. followed by 2 hours at 225° F. before adhesion testing. The results are shown in the table.

TABLE

| TREATMENT | PEEL TEST VALUES FOR 4 MILS OF ELECTROPLATE | | | CYCLE TEST 225° to −30° F. |
|---|---|---|---|---|
| | RANGE | AV | COMPOSITION | (3 cycles) |
| 9 mns PM-930, 152° F. | 4.2–7.3 | 5.2 | Cu | 4/4 passed |
| 18 mns PM-930, 152° F. | 5.1–6.6 | 5.8 | Cu/Ni/Cr | 4/4 passed |
| 15 secs PM-920, 9 mns. PM-930 | 3.5–6.1 | 5.0 | Cu/Ni/Cr | 4/4 passed |
| 30 secs PM 920, 9 mns. PM-930 | 5.2–6.4 | 5.9 | Cu/Ni/Cr | 4/4 passed |

What is claimed:

1. A metal plated poly(aryl ether) containing article, said poly(aryl ether) comprising a blend of a poly(aryl ether) polymer, a styrene copolymer, acrylic copolymer and a compatibilizing in amounts of from about 0.5 to about 20 weight percent of a polyhydroxyether.

2. A composition as defined in claim 1 wherein the poly(aryl ether) has recurring units of the formula:

$$O-E-O-E'$$

wherein E is the residuum of a dihydric phenol and E' is the residuum of a benzenoid compound having inert electron withdrawing groups in at least one of the position ortho and para to the valence bonds and wherein both of said residuum are valently bonded to the ether oxygen through aromatic carbon atoms.

3. An article as defined in claim 1 wherein the poly(aryl ether) has repeating units of the formula:

$$\left[ O-\text{C}_6\text{H}_4-\text{C}(CH_3)_2-\text{C}_6\text{H}_4-O-\text{C}_6\text{H}_4-SO_2-\text{C}_6\text{H}_4 \right].$$

4. An article as defined in claim 1 wherein the poly(aryl ether) has repeating units of the formula:

$$\left[ O-\text{C}_6\text{H}_4-SO_2-\text{C}_6\text{H}_4 \right].$$

5. An article as defined in claim 1 wherein the poly(aryl ether) has repeating units of the formula:

$$\left[ O-\text{C}_6\text{H}_4-\text{CO}-\text{C}_6\text{H}_4 \right].$$

6. An article as defined in claim 1 wherein the poly(aryl ether) has repeating units of the formula:

$$\left[ O-\text{C}_6\text{H}_4-\text{CO}-\text{C}_6\text{H}_4-O-\text{C}_6\text{H}_4 \right].$$

7. An article as defined in claim 1 wherein the poly(aryl ether) is present in amounts of from about 20 to about 85 weight percent.

8. An article as defined in claim 1 wherein the styrene copolymer is butadiene/styrene/acrylonitrile resin.

9. An article as defined in claim 1 wherein the acrylic copolymer is a copolymer of methyl methacrylate with a vinyl monomer.

10. An article as defined in claim 1 wherein the acrylate copolymer is poly(methyl methacrylate) grafted onto an elastomeric backbone.

11. An article as defined in claim 1 wherein the copolymer is an acrylate-styrene-acrylonitrile polymer.

12. An article as defined in claim 1 wherein the styrene copolymer, acrylic copolymer or mixture thereof is present in amounts of from about 15 to about 80 weight percent.

13. An article as defined in claim 1 wherein the polyhydroxyether has the general formula:

$$\left[ F-O-E''-O \right]_n.$$

wherein F is the radical residuum of a dihydric phenol, E is a radical residuum of an epoxide selected from mono- and diepoxides and containing from 1 to 2 hydroxyl groups and n is an integer which represents the degree of polymerization and is at least 20.

14. An article as defined claims 1 or 13 wherein the polyhydroxyether has repeating units of the formula:

$$\left[ O-\text{C}_6\text{H}_4-\text{C}(CH_3)_2-\text{C}_6\text{H}_4-OCH_2CH(OH)CH_2 \right]_n.$$

15. An article as defined in claim 1 which contains an impact modifier which is a graft copolymer of a vinyl aromatic, an acrylate, an unsaturated nitrile, or mixtures thereof, grafted onto an unsaturated elastomeric backbone and having a tensile modulus of less than about 100,000 psi.

16. An article molded from the composition of claims 1 or 13 in the form of plumbingware.

17. An article as defined in claim 1 where the metal is chromium.

18. An article as defined in claim 1 where the metal is brass.

19. An article as defined in claim 1 where the metal is nickel.

* * * * *